E. CARRINGTON.
Process for Cutting and Shaping Pearl Shells.
No. 134,851.    Patented Jan. 14, 1873.
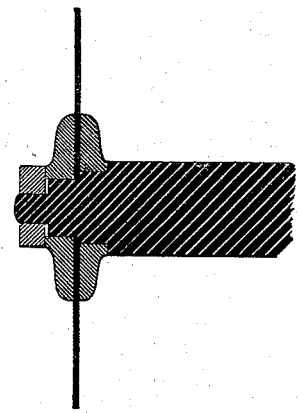
Witnesses
A. J. Tibbits
J. H. Shumway
Edwin Carrington
Inventor
By Atty —
John O. Earle

UNITED STATES PATENT OFFICE.

EDWIN CARRINGTON, OF WEST MERIDEN, CONNECTICUT.

IMPROVEMENT IN PROCESSES FOR CUTTING AND SHAPING PEARL-SHELL.

Specification forming part of Letters Patent No. 134,851, dated January 14, 1873.

*To all whom it may concern:*

Be it known that I, EDWIN CARRINGTON, of West Meriden, in the county of New Haven and State of Connecticut, have invented a new Improvement in Cutting Pearl-Shell; and I do hereby declare the following to be a full, clear, and exact description of the same, when taken in connection with the accompanying drawing, which constitutes part of this specification, and represents a sectional view of the dressing-instrument.

The invention relates to an improvement in the process of cutting and shaping pearl-shell in the manufacture of buttons and other articles usually produced from this material.

The process now in general use is to divide the shells into strips or pieces by a common toothed saw, which is a very slow operation. After being sawed into strips the strips are turned up edgewise and split by means of a cleaving-tool. As the grain of the shell is naturally irregular or wavy, many of the pieces are lost. The pieces which are of irregular form are ground upon an ordinary grindstone to flatten and bring them to shape; hence all the irregularities occasion a corresponding loss. Another difficulty or loss is occasioned from the fact that the teeth of the saw will chip or flake off portions of the shell.

The object of this invention is to avoid this loss of material as well as the labor of grinding. My process consists in cutting the shell into strips and splitting and generally shaping by means of a smooth-edged rapidly-revolving or reciprocating surface, as more fully hereinafter described.

In carrying out my process, I employ for the cutting and splitting, by preference, a thin disk of steel or suitable material revolving rapidly, the edge of the disk smooth or without projections. The shell to be cut is pressed against the edge, substantially as in sawing, a supply of water being furnished to prevent the heating. This disk works rapidly into the pearl, as fast as with the ordinary saw, and the disk as it leaves the shell does not split or flake the shell, as in the use of the ordinary saw, and this process is employed for splitting in the same manner. This cannot be done by a toothed saw in consequence of the tearing or flaking of the surface.

This process leaves the surface so perfectly smooth that polishing only is required to finish it, and in no way discolors the shell.

While preferring a revolving disk, as described, a reciprocating smooth-edged plate may be employed. In such case the reciprocation should be correspondingly rapid.

By this process the shell can be cut or dressed in any desired direction without injury to the shell, and the edge of the disk or dressing device may be formed to the shape for the article to be produced, and thus dress the shell by this process to the required shape. By this process there is comparatively little waste of material and a large per cent. of saving of time.

I claim as my invention—

The process herein described for cutting, dressing, or shaping pearl-shell.

EDWIN CARRINGTON.

Witnesses:
A. J. TIBBITS,
J. H. SHUMWAY.